United States Patent [19]

Pflederer

[11] Patent Number: 4,546,895

[45] Date of Patent: Oct. 15, 1985

[54] LOOP BOUND ORTHOTROPIC PRESSURE VESSEL

[75] Inventor: Fred R. Pflederer, Milwaukee, Wis.

[73] Assignee: A. O. Smith Corporation, Milwaukee, Wis.

[21] Appl. No.: 616,567

[22] Filed: May 31, 1984

[51] Int. Cl.$^4$ ............................................. B65D 53/02
[52] U.S. Cl. ......................................... 220/3; 220/66; 220/71; 220/72; 220/414
[58] Field of Search ...................... 220/3, 66, 71, 72.1, 220/414, 453, 72, 413

[56] References Cited

U.S. PATENT DOCUMENTS

| | | | |
|---|---|---|---|
| 2,858,992 | 11/1958 | Wentz | 220/3 X |
| 3,011,844 | 12/1958 | Maha et al. | |
| 3,047,191 | 7/1962 | Young | 220/66 X |
| 3,303,079 | 2/1967 | Carter | 220/414 X |
| 3,367,815 | 2/1968 | Ragettli et al. | 220/3 X |
| 3,368,708 | 2/1968 | Pflederer | 220/71 X |
| 3,476,281 | 12/1967 | Cornish et al. | |
| 3,662,780 | 5/1972 | Marsh | 220/3 X |
| 3,693,822 | 9/1972 | Thillet | 220/3 |
| 3,969,812 | 7/1976 | Beck | 220/3 X |
| 4,391,301 | 7/1983 | Pflederer | 220/72 X |

FOREIGN PATENT DOCUMENTS

| | | | |
|---|---|---|---|
| 861544 | 10/1940 | France | 220/3 |
| 561924 | 6/1944 | United Kingdom | 220/3 |

OTHER PUBLICATIONS

"Formulas for Stress and Strain", Case 1/Chapter 12, Raymond J. Roark, McGraw-Hill, 1965.

*Primary Examiner*—Steven M. Pollard
*Attorney, Agent, or Firm*—Andrus, Sceales, Starke & Sawall

[57] ABSTRACT

An orthotropic pressure vessel (2) is provided by a cylindrical filament wound body (4) having open ends, a pair of end plates (8, 10) sealingly disposed at the open ends of the body, and one or more axial continuous endless loops (18) engaging the end plates and maintaining them in position when the vessel is filled with a fluid under pressure. Hoop to axial stress ratios greater than or equal to about 15:1, and helix angles less than or equal to about 15°, are provided. One end plate is stationary, and the other is axially slideable along the inner wall of the cylindrical body. Exterior and interior loop bound versions are disclosed. Various end plates and body end designs are disclosed for increased loop life, uniform force distribution for lighter and thinner end plates, and pressurized axial loading of the vessel wall.

20 Claims, 10 Drawing Figures

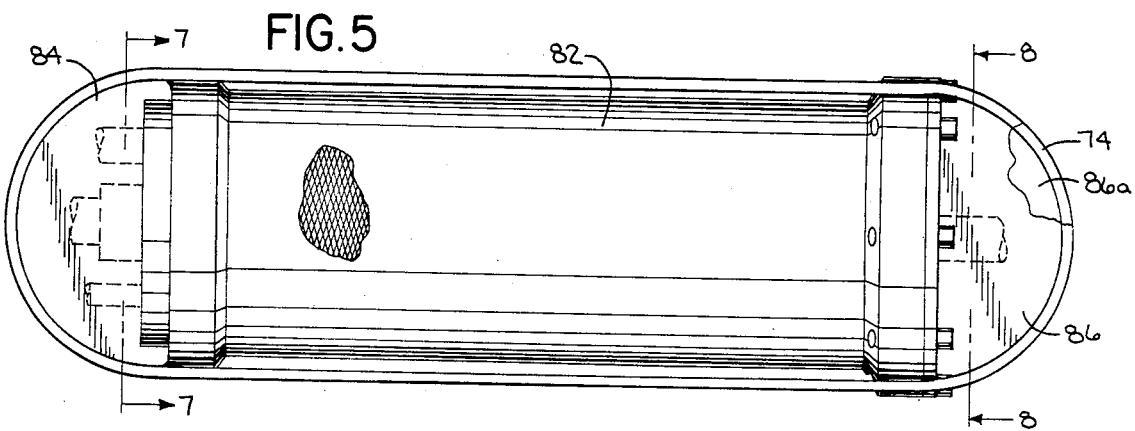
FIG.5
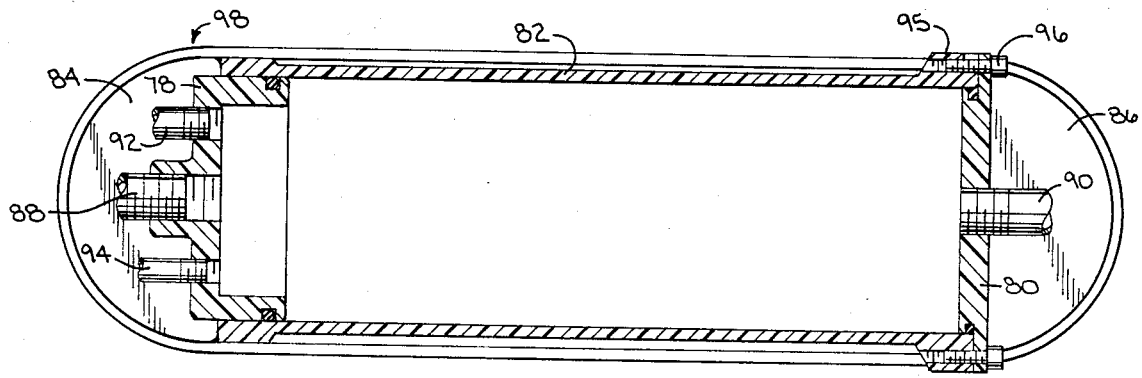
FIG.6
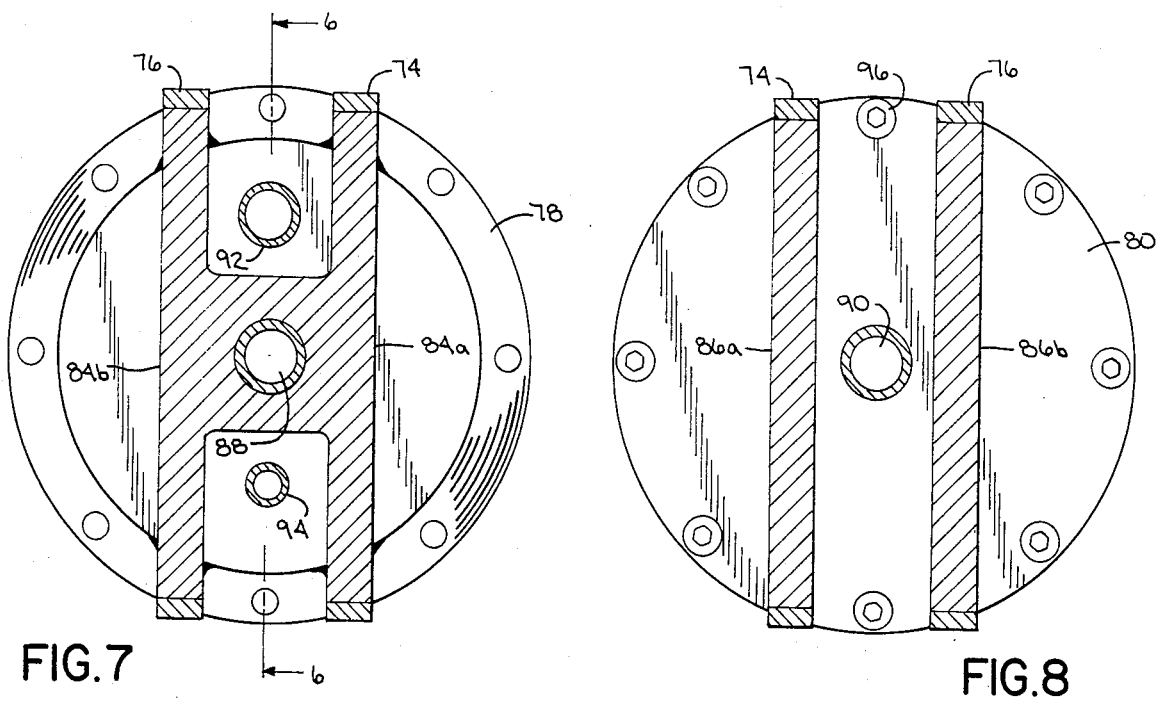
FIG.7
FIG.8

LOOP BOUND ORTHOTROPIC PRESSURE VESSEL

BACKGROUND AND SUMMARY

The invention relates to a filament wound orthotropic pressure vessel, and is an improvement over that shown in my prior U.S. Pat. No. 3,368,708.

Filament wound vessels have orthotropic load bearing capabilities. This means that the load capacity in one direction is substantially greater than in another direction. For example, a filament wound body can support substantially greater loading in the direction of the fibers than in a direction transverse thereto. In contrast, isotropic material, such as steel, brass and the like, has substantially the same load bearing capability in all three dimensions.

As noted in my prior U.S. Pat. No. 3,368,708, it is desirable to provide a filament wound vessel having a wall stress condition capable of withstanding high internal pressures without weeping. Filament wound vessels are generally fabricated by helically winding a strand of fibrous material impregnated with a thermosetting resin about a cylindrical mandrel in a number of superimposed layers.

When a filament wound vessel is subjected to internal pressure, a tensile stress occurs at the interface between the resin and the fibrous reinforcing material. When the bond between the resin and the fiber fractures, weeping occurs through the vessel wall.

Prior to my said U.S. Pat. No. 3,368,708, one type of cylindrical body vessel wall was typically designed for a 2:1 ratio of hoop stress to axial stress. The winding pattern normally used to meet such stress ratio normally placed two-thirds of the filaments in the hoop direction and one-third of the filaments in the axial direction. In other cases, the fibrous material was wound at a 35¼° helix angle in alternate right hand and left hand helixes with respect to a transverse plane through the vessel. Both of these previous winding patterns were established so that the fibrous reinforcement was loaded in pure tension under the 2:1 stress ratio.

In my prior U.S. Pat. No. 3,368,708, the axial load imposed on the cylinder wall was reduced. The hoop to axial stress condition in the wall was charged from the previous 2:1 ratio to a higher value in the range of 5:1 to 8:1, which in turn withstood a much higher hoop stress before suffering fracture of the resin-reinforcement interfacial bond. The helix angle was in the range of 24° to 19½° to match the stress ratio condition of 5:1 to 8:1 respectively. The vessel withstood much higher internal pressures without weeping.

The high hoop to axial stress ratio in my prior U.S. Pat. No. 3,368,708 is obtained by one or more longitudinal tie rods taking a portion of the axial load. The rods are secured to one fixed head of the vessel and the opposite ends of the rods are secured to a floating member in the opposite head. The floating member is a central circular section of the opposite head which is connected to the remaining annular portion of the head by a flexible seal which permits relative motion between the circular floating member which is connected to the tie rods and the annular portion of the head which is connected to the cylindrical wall section. When the vessel is subjected to internal pressure, the cylindrical wall expands radially due to the hoop stress, and the radial expansion will tend to shorten the axial length of the vessel. The pressure exerted against the annular section of the head at the end will be imposed as an axial stress in the cylindrical wall which partially offsets the axial shortening, with the result that the opposing head sections move axially toward each other. The pressure acting against the circular floating head member creates a tensile stress in the tie rods such that the fixed head and opposite floating head member move away from each other, and relative movement occurs between the floating member and the annular portion of its head section.

The present invention provides further separation of radial and axial loading and enables even higher hoop to axial stress ratios greater than or equal to about 15:1. The cylindrical body of the vessel is wound substantially only in the hoop direction at a helix angle less than or equal to about 15°, without winding around the axial ends of the body. One or more axial continuous filament orthotropic loops carry axial loading and maintain end plates at the open ends of the cylindrical body. The axial length of the body shrinks while the axial loops lengthen. This gives superior performance in high pressure applications.

BRIEF DESCRIPTION OF THE DRAWINGS

FIG. 5 is a side elevation view of an alternate embodiment of a filament wound pressure vessel constructed in accordance with the invention.

FIG. 6 is a cross sectional view of the vessel of FIG. 5 taken along line 6—6 of FIG. 7.

FIG. 7 is a left end elevation view of the vessel of FIG. 5, taken along line 7—7 of FIG. 5.

FIG. 8 is a right end elevation view of the vessel of FIG. 5, taken along line 8—8 of FIG. 5.

DETAILED DESCRIPTION

Figure 1:
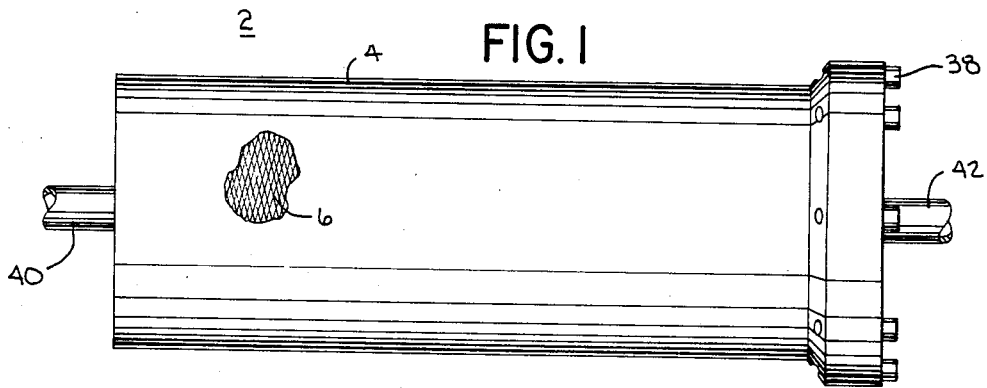
FIG. 1 is a side elevation view of a filament wound pressure vessel constructed in accordance with the invention.
Figure 2:
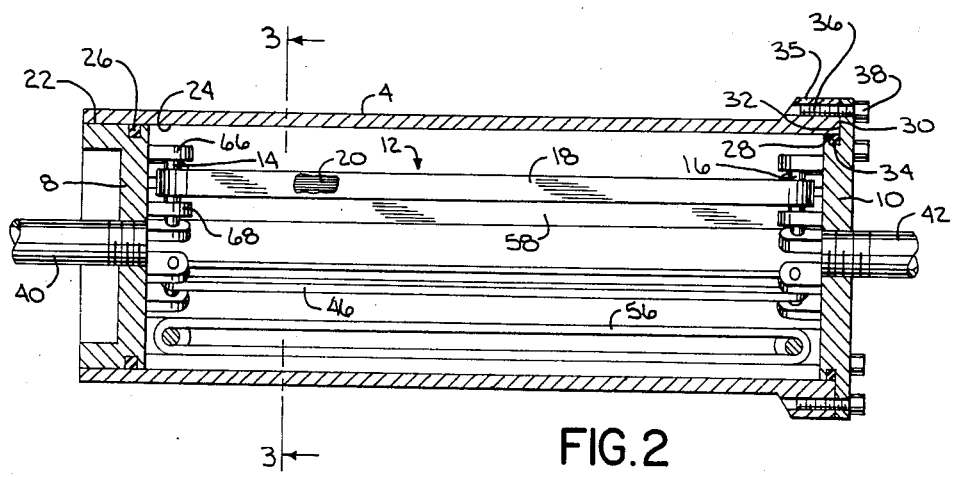
FIG. 2 is a cross sectional view of the vessel of FIG. 1.

FIG. 1 shows a filament wound vessel 2 for containing fluid under pressure. A cylindrical filament wound orthotropic body 4 has a hoop to axial stress ratio greater than or equal to about 15:1, composed of a tension mode helically wound fibrous strand 6 bonded with a thermosetting resin and wound at a helix angle less than or equal to about 15° with respect to a transverse plane through the vessel. A pair of end plates 8 and 10, FIG. 2, are sealingly disposed at the open ends of body 4, and means 12 is provided for maintaining the end plates in position when the vessel is filled with a fluid under pressure.

End plates 8 and 10 have loop-engaging surfaces such as 14 and 16, and means 12 includes at least one continuous endless axial loop 18 engaging the end plates. Loop 18 is a filament wound orthotropic member composed of an axially wound fibrous strand 20 bonded with a thermosetting resin. The axially extending fibers are in axial tension providing substantially greater axial strength than transverse strength.

Radial and axial loads are substantially separated and isolated. Radial loading is carried substantially by the filament wound cylindrical body 4 whose filament is wound substantially in the hoop direction, not around the axial ends of the body. Axial loading is carried substantially by the separate continuous axial loop member 18.

Each of end plates 8 and 10 is a one-piece member. End plate 8 has a cylindrical surface 22 engaging the inner wall 24 of cylindrical body 4 and axially slideable therealong. The interface is sealed by O-ring gasket 26. End plate 10 is stationary, and has a first surface 28 engaging the inner wall 24 of cylindrical body 4 along an axial plane, and a second surface 30 engaging the end 32 of body 4 along a radial plane. The interface is sealed by an O-ring gasket 34. The end 32 of body 4 has an increased outer diameter at 35. Attachment means 36 is provided in this increased outer diameter end wall 32 of the body for securing stationary end plate 10 thereto, for example by threaded bolts such as 38 around the circumference. Threaded ports such as 40 and 42 in the end plates are provided for entry and exit of fluid.

Figure 3:
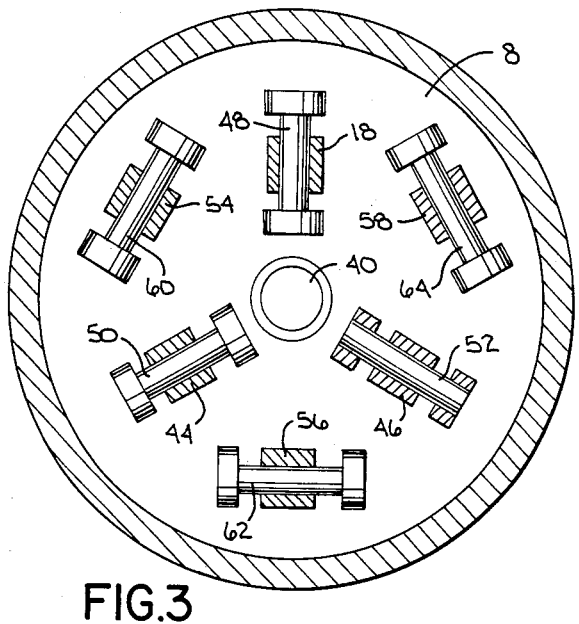
FIG. 3 is a cross sectional view taken along line 3—3 of FIG. 2.
Figure 4:
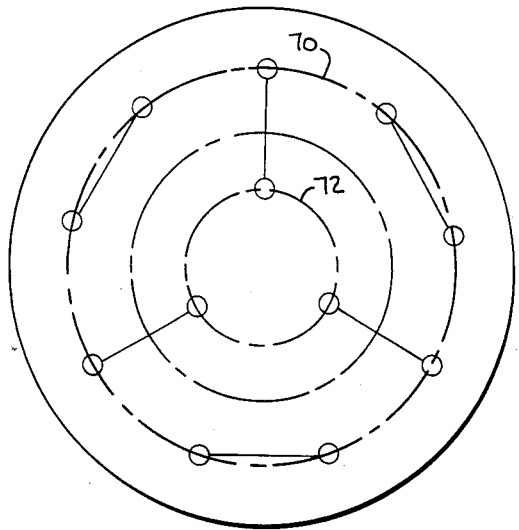
FIG. 4 is a schematic illustration of pressure force distribution points in FIG. 3.

In FIG. 2, a plurality of continuous endless axial loops engage the end plates interiorly of the body at uniformly distributed attachment points to uniformly distribute loading pressure and enable lighter and thinner end plates. A first group of loops 18, 44 and 46, FIG. 3, engage spaced radial shear pins 48, 50 and 52 on end plate 8. A second group of loops 54, 56 and 58 engage spaced circumferential shear pins 60, 62 and 64 on end plate 8. A complementary set of shear pins are on stationary end plate 10. The pins are mounted between ears or bosses such as 66 and 68, FIG. 2, extending axially inwardly from the respective end plate. In one particular species, as shown in FIG. 4, the outer tips of the radial pins and both tips of the circumferential pins are located on a circumference 70 defined by a common center point and common radius. The inner tips of the radial pins are located on a circumference 72 incentric to the noted circumference 70.

In FIGS. 5-8, one or more axial continuous endless loops such as 74 and 76 engage end plates 78 and 80 exteriorly of filament wound cylindrical body 82. Each end plate has a rounded head portion 84 and 86, respectively, for receiving loops 74 and 76. These rounded head portions include spaced parallel raised arcuate shoulders 84a, 84b and 86a, 86b, receiving the loops. Threaded ports such as 88 and 90 are provided for entry and exit of fluid and are located centrally in the end plates between the loops, and may be supplemented with auxiliary ports such as 92 and 94. The increased outer diameter 95 at the right end of cylindrical body 82 and the attachment means such as bolts 96 are comparable to the embodiment in FIGS. 1-4.

The radius of curvature of loops 74 and 76 in the area such as 98, FIG. 6, of their initial engagement with a respective rounded head is greater than the radius of curvature of the head. This mismatch of the mating interface surface between the head and the endless loop causes a beneficial preload, which minimizes loop failure otherwise due to bending in the opposite direction. The differential radii thus facilitate increased loop life.

Figure 9:
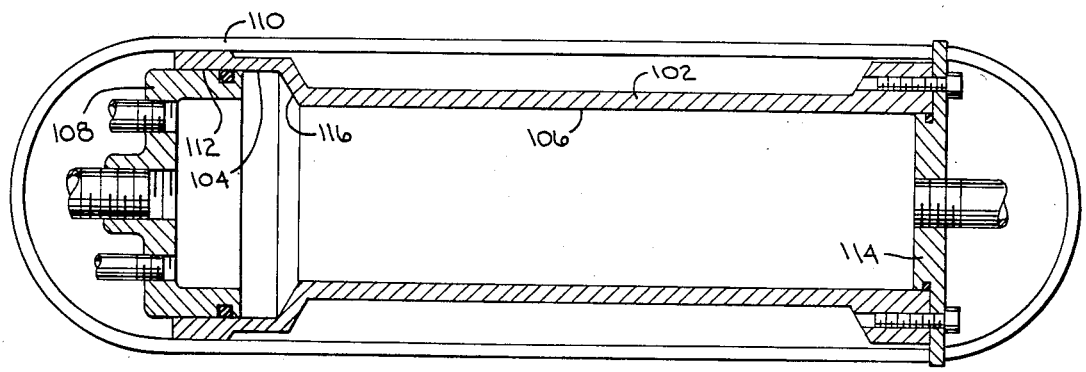
FIG. 9 is a cross sectional view like FIG. 6, showing another alternate embodiment of the invention.

In the embodiment in FIG. 9, the left end of cylindrical body 102 has an increased inner diameter 104 greater than the inner diameter 106 of the central portion of body 102. Moveable end plate 108 is directly engaged by one or more continuous endless filament wound loops such as 110 and has a cylindrical surface portion 112 of a diameter mating with the inner diameter 104 of the left end enlarged section of body 102. Stationary end plate 114 is secured to the right end of body 102 in the manner above described. The differential inner diameters 106 of the central body portion and 104 of the enlarged body end provide a pressurized annulus 116 placing the wall of body 102 in axial compression. This further prevents splitting and cracking between the fibers of the filament winding of cylindrical body 102, to thus further prevent weeping.

Figure 10:
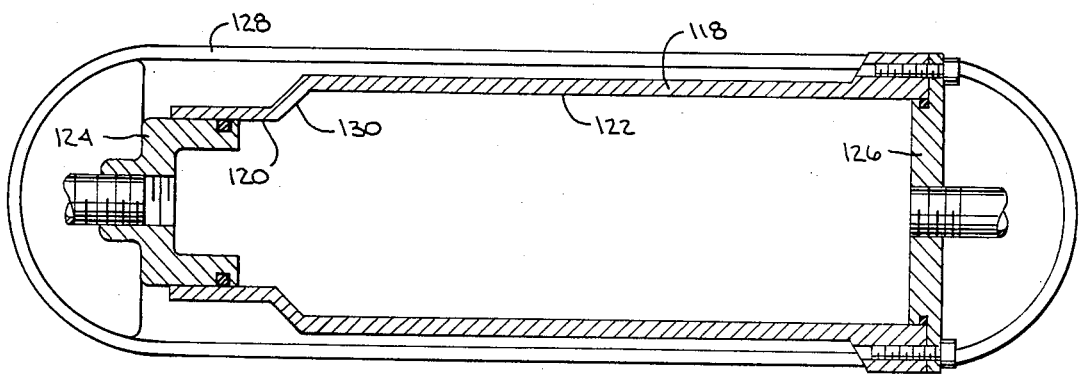
FIG. 10 is a cross sectional view like FIG. 6, showing a further alternate embodiment of the invention.

In FIG. 10, the left end of filament wound cylindrical body 118 has a reduced inner diameter 120 less than the inner diameter 122 of the central portion of the body. Moveable end plate 124 and stationary end plate 126 are directly engaged by one or more continuous loops such as 128, as above. The differential inner diameters 122 of the central body portion and 120 of the body end provide a pressurized annulus 130 placing the wall of body 118 in axial tension, counteracting the radial outward force due to internal pressure, to afford another manner of preventing weeping.

It is recognized that various modifications are possible within the scope of the appended claims.

I claim:

1. A filament wound vessel comprising:
   an orthotropic cylindrical body having a hoop to axial stress ratio greater than or equal to about 15:1 and composed of a tension mode helically wound fibrous strand;
   a pair of end plates sealingly disposed at the axial ends of said body; and
   means maintaining said end plates in position when said vessel is filled with fluid under pressure, the radial component of the internal pressure within said vessel tending to expand said cylindrical body radially, the axial component of said internal pressure acting against said means maintaining said end plates,
   wherein said means maintaining said end plates comprises at least one continuous loop comprising a filament wound orthotropic member having axially extending fibers in axial tension providing substantially greater axial strength than transverse strength,
   said cylindrical body being substantially wound only in the hoop direction without winding around the axial ends of said body such that said filament wound cylindrical body carries substantially only radial loading, and said end plates and filament wound continuous loop carry substantially only axial loading, whereby to substantially separate and isolate radial loads from axial loads.

2. A vessel for containing fluid under pressure comprising:
   a substantially cylindrical filament wound orthotropic body having open ends and having substantially greater radial load bearing capacity than axial load bearing capacity;
   a pair of end plates sealingly disposed at respective said open ends of said body, each said end plate having a loop-engaging surface; and
   at least one continuous loop engaging said end plates and maintaining said end plates in position when said vessel is filled with fluid under pressure,
   wherein said continuous loop is a filament wound orthotropic member having substantially greater axial load bearing capability than transverse load bearing capability, the radial component of the internal pressure within said vessel tending to expand said cylindrical body radially and applying opposing outwardly directed axial forces on said end plates, the radial load being carried by the filament of said body in a tension mode, and the axial load being carried by the separate and isolated member provided by the filament of said continuous loop in a tension mode, whereby to substantially separate and isolate radial loads from axial loads.

3. The invention according to claim 2 wherein said filament of said body is wound substantially only in the hoop direction, without winding around the axial ends of said body.

4. The invention according to claim 2 wherein each of said end plates is a one-piece member.

5. The invention according to claim 2 wherein at least one of said end plates is axially slideable along the inner wall of said cylindrical body.

6. The invention according to claim 5 wherein said loop directly engages said one moveable end plate.

7. A vessel for containing fluid under pressure comprising:
 a substantially cylindrical filament wound orthotropic body having open ends and having substantially greater radial load bearing capacity than axial load bearing capacity;
 a pair of end plates sealingly disposed at respective said open ends of said body, each said end plate having a loop-engaging surface; and
 at least one continuous loop engaging said end plates and maintaining said end plates in position when said vessel is filled with fluid under pressure, wherein said loop engages said end plates interiorly of said body.

8. The invention according to claim 7 comprising a plurality of loops engaging said end plates at uniformly distributed attachment points to uniformly distribute loading pressure and enable lighter and thinner end plates.

9. The invention according to claim 8 comprising a first group of loops engaging spaced radial shear pins on said end plates, and a second group of loops engaging spaced circumferential shear pins on said end plates.

10. The invention according to claim 9 wherein the outer tips of said radial pins and both tips of said circumferential pins are located on a circumference defined by a common center point and common radius, and wherein the inner tips of said radial pins are located on a circumference incentric to said last mentioned circumference.

11. The invention according to claim 2 wherein said loop engages said end plates exteriorly of said body.

12. The invention according to claim 11 wherein each said end plate has a rounded head for receiving said loop, and wherein the radius of curvature of the loop in the area of its initial engagement with a respective said head is greater than the radius of curvature of the head to provide preload bending affording increased life.

13. The invention according to claim 11 comprising two said loops, and wherein at least one of said end plates has a central axial port therethrough between said loops.

14. The invention according to claim 2 wherein one end of said cylindrical body has an increased inner diameter greater than the inner diameter of the central portion of said body, and wherein the differential inner diameters of said central body portion and said body end provide a pressurized annulus placing the body wall of said central body portion in axial compression.

15. The invention according to claim 14 wherein said pressurized annulus is at the transition between said diameters.

16. The invention according to claim 2 wherein one end of said cylindrical body has a reduced diameter less than the inner diameter of the central portion of said body, and wherein the differential inner diameters of said central body portion and said body end provide a pressurized annulus opposing the opposite said end plate and placing the body wall of said central body portion in axial tension to counteract the radial outward expansion thereof.

17. A vessel for containing fluid under pressure comprising:
 a cylindrical filament wound tension mode orthotropic body having open ends, and supporting substantially greater radial loads than axial loads;
 a pair of end plates sealingly disposed at said open ends of said body, each said end plate having a loop-engaging surface, at least one of said end plates having a cylindrical surface engaging the inner wall of said cylindrical body and axially slideable therealong; and
 at least one continuous loop engaging said end plates and maintaining said end plates in position when said vessel is filled with a fluid under pressure, wherein said at least one continuous loop is a filament wound orthotropic member having substantially greater axial load bearing capability than transverse load bearing capability, and wherein said body is substantially wound only in the hoop direction without winding around the axial ends of said body such that the radial and axial loads are substantially separated and isolated, with said filament wound body carrying the radial load, and said filament wound continuous loop carrying the axial load.

18. The invention according to claim 17 wherein the other of said end plates is stationary relative to said body and includes a first surface engaging the inner wall of said cylindrical body along a generally axial plane, and a second surface engaging the end of said cylindrical body along a generally radial plane.

19. The invention according to claim 18 wherein the end of said cylindrical body adjacent said stationary end plate has an increased outer diameter and includes attachment means in the wall of said body at said increased outer diameter for securing said stationary end plate thereto.

20. The invention according to claim 17 wherein said filament wound cylindrical body has a hoop to axial stress ratio greater than or equal to about 15:1, and said filament is wound at a helix angle less than or equal to about 15°.

* * * * *